April 4, 1961 C. G. SONTHEIMER 2,978,660
ADJUSTABLE CONTROLLABLE INDUCTANCE TUNING APPARATUS
Filed May 14, 1957 4 Sheets-Sheet 1
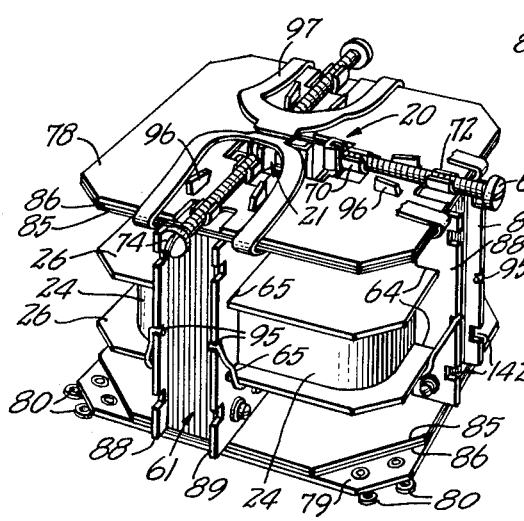
FIG. 1.
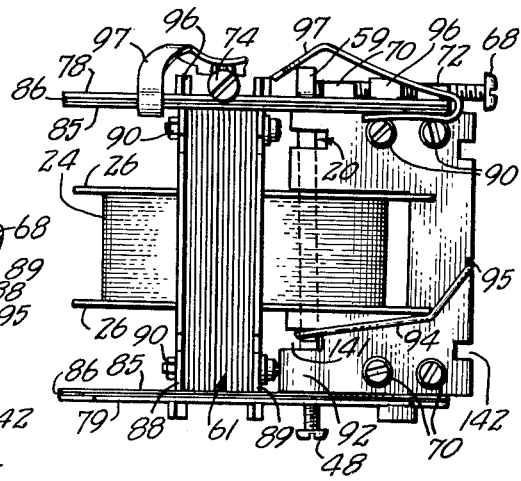
FIG. 2.
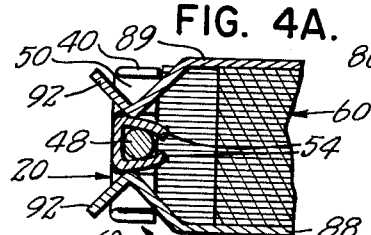
FIG. 4A.
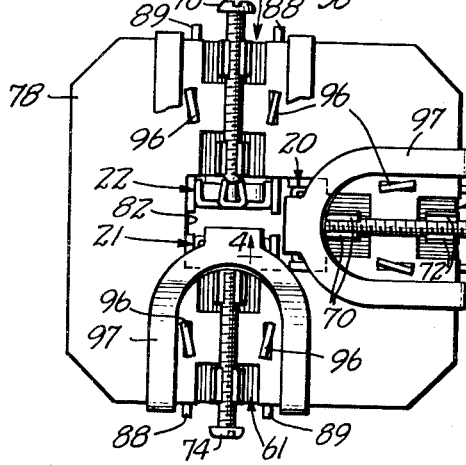
FIG. 3.
FIG. 4.
INVENTOR
CARL G. SONTHEIMER
BY
Curtis Morris & Safford
ATTORNEYS April 4, 1961   C. G. SONTHEIMER   2,978,660
ADJUSTABLE CONTROLLABLE INDUCTANCE TUNING APPARATUS
Filed May 14, 1957   4 Sheets-Sheet 2
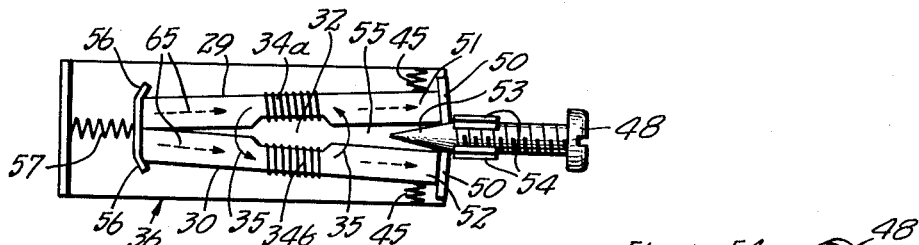
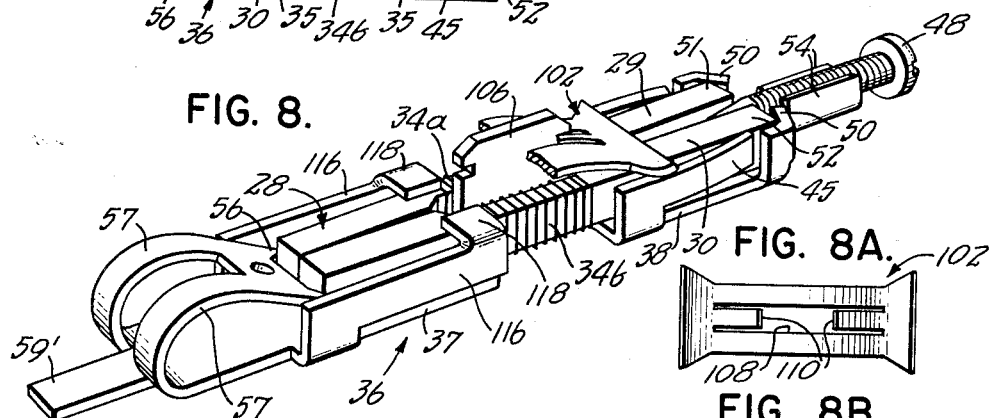
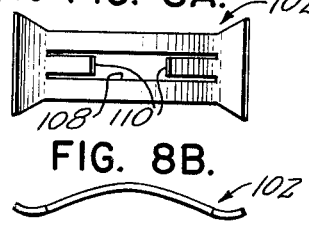
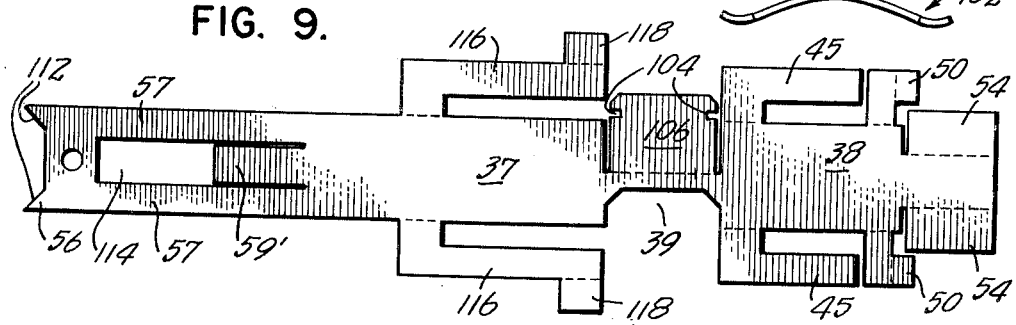
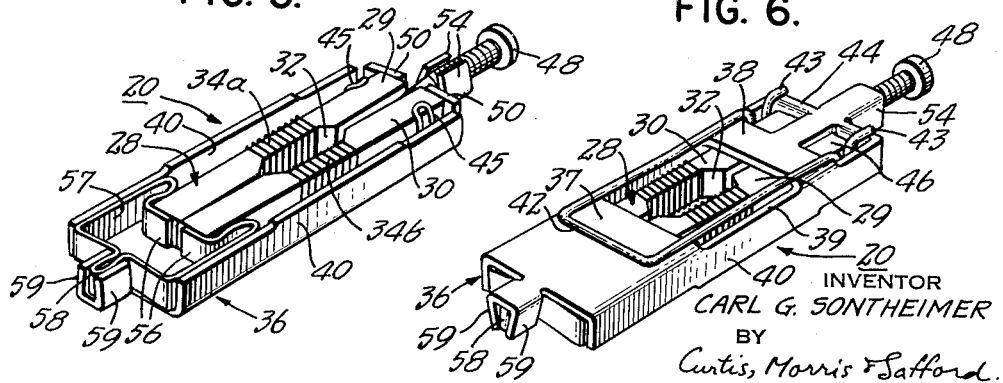
INVENTOR
CARL G. SONTHEIMER
BY
Curtis, Morris & Safford.
ATTORNEYS April 4, 1961  C. G. SONTHEIMER  2,978,660
ADJUSTABLE CONTROLLABLE INDUCTANCE TUNING APPARATUS
Filed May 14, 1957  4 Sheets-Sheet 3
FIG. 10.
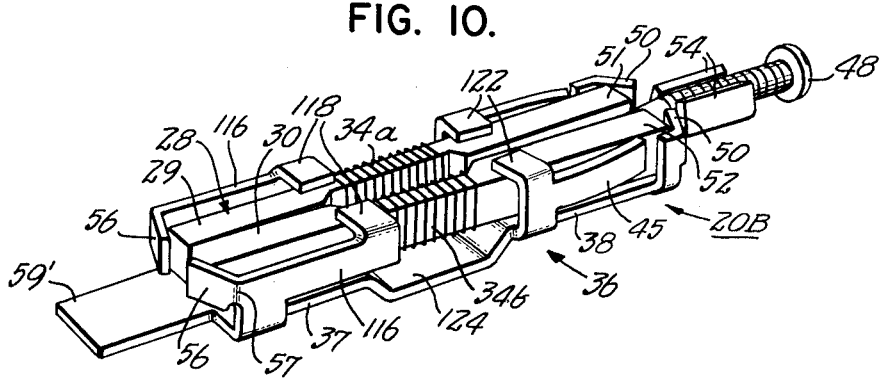
FIG. 11.
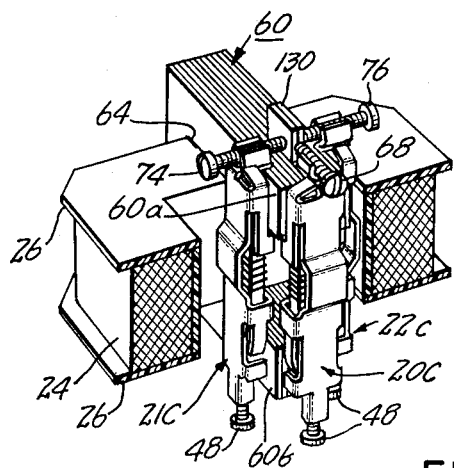
FIG. 12.
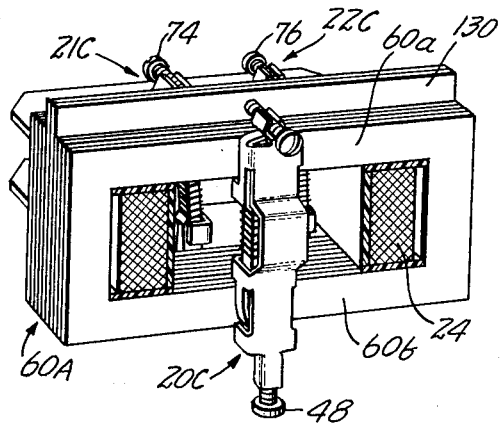
FIG. 13. FIG. 14. FIG. 15.
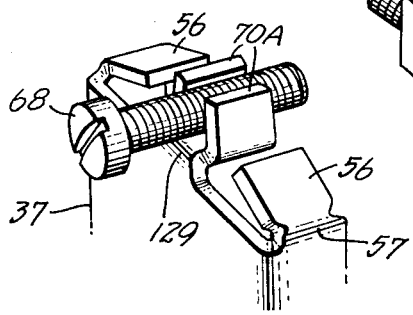
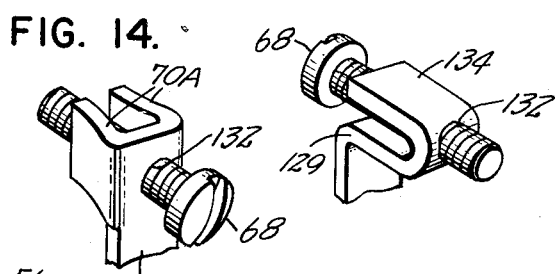
INVENTOR
CARL G. SONTHEIMER
BY
Curtis, Morris & Safford
ATTORNEYS April 4, 1961　　　C. G. SONTHEIMER　　　2,978,660
ADJUSTABLE CONTROLLABLE INDUCTANCE TUNING APPARATUS
Filed May 14, 1957　　　　　　　　　　　　　　4 Sheets-Sheet 4

INVENTOR
CARL G. SONTHEIMER
BY
Curtis, Morris & Safford
ATTORNEYS

United States Patent Office 2,978,660
Patented Apr. 4, 1961

2,978,660

ADJUSTABLE CONTROLLABLE INDUCTANCE TUNING APPARATUS

Carl G. Sontheimer, South Norwalk, Conn., assignor to C.G.S. Laboratories, Inc., Stamford, Conn., a corporation of Connecticut Filed May 14, 1957, Ser. No. 662,309

28 Claims. (Cl. 336—135)

The present invention relates to improved adjustable controllable inductance tuning apparatus and more particularly to improved controllable inductors having a plurality of controlled signal inductances and providing independent adjustment of the signal inductances as a function of the control current at both the low and high current ends of the control current curves.

Among the many advantages of the improved controllable inductors described herein as illustrative embodiments of the present invention are those resulting from the fact that each of the signal core portions or parts of the inductor is supported by its own removable support forming a unitary signal core and winding assembly which can be removed from the inductor. Thus, the various signal core and winding assemblies are enabled to be removed and replaced by identical units for testing or repair purposes. Moreover, each of the removable signal core and winding assemblies includes its own tuning adjustment means enabling adjustment of the inductance and frequency characteristics independently of the other signal windings.

A further advantage is provided by the fact that whenever one of these signal core and winding units is removed from the inductor it retains its adjusted characteristics and can later be returned to the controllable inductor with the same adjustment. By virtue of the fact that the adjustment means is carried on the tray support along with the signal core portion the adjustment is retained. Thus, pre-testing of the adjusted characteristics of the various signal winding assemblies can be utilized prior to final assembly of the controllable inductor. Mass production of the signal core units is facilitated. Each unit may be pre-fabricated and pre-adjusted with respect to a suitable production standard prior to its assembly into the controllable inductor.

Adjustment means described herein as being associated with each signal core and winding assembly include a pointed screw arranged to adjust the spacing in a non-magnetic gap in series with the path followed by the magnetic flux associated with the signal winding. In the illustrative embodiments of the present invention described herein, these non-magnetic gaps are adjustable air gaps in the respective signal flux paths. Advantageously, the adjusting screw is held by being pressed between opposed gripping fingers. The threads in the inner surfaces of the opposed fingers which mate with the adjusting screw are conveniently formed by cold forging, by squeezing these fingers about the adjusting screw itself.

Other adjustment means described herein as being associated with each signal core and winding assembly include another adjusting screw arranged to adjust the spacing in a non-magnetic gap in series with the path followed by the control flux in passing through the signal core portion of the structure. In the embodiments of the invention described herein as illustrative, these non-magnetic gaps are adjustable air gaps and the screws are advantageously held between opposed fingers.

Among the further advantages of the improved controllable inductors described herein as illustrative embodiments of this invention are those resulting from the fact that the signal inductance values can also be quickly and conveniently adjusted after the controllable inductor is fully assembled and after it is fully installed in an electrical circuit ready for operation. When making adjustments after assembly or installation, there is no requirement for removal of or for disturbing any of the parts. The adjusting elements are readily accessible and enable accurate adjustments of the signal inductance values.

A further advantage of the adjustment apparatus of the present invention is that the signal inductance values are adjustable at both the low and the high current ends of the control current curves. Moreover, these adjustments are substantially independent of each other so that the low or the high ends of the curves can be adjusted at will as may be required by the particular circuit installation. In addition, each of the plurality of signal inductance values are separately adjustable.

Advantageously, the adjustments are continuous. That is, the controlled signal inductance values can be incrementally adjusted throughout the range of operation so that accurate precise results are obtained.

In the illustrative embodiments of the invention described herein, three signal inductance windings are controlled by a single control winding. By virtue of the adjustment methods and apparatus described the inductance values of these three signal windings are enabled to follow each other or "track" each other with corresponding characteristics or desired related functions of the control current as the control current is changed. Thus, in installations where tracking of the signal winding inductances is required, the three controlled windings are readily adjusted to provide the desired tracking characteristics.

A further advantage of the controllable inductors described herein is their ability to withstand severe shock and vibration stresses without any adverse effects or changes in adjusted values.

Another advantage of the present invention is the provision of improved methods and apparatus for obtaining proper "tracking" of controlled circuits.

As used herein, the term "controllale inductor" refers to electrical apparatus including at least one controlled signal winding associated with a magnetically saturable signal core part or portion of the core structure. Changes in the degree of magnetic saturation of the signal core portion alter the effective incremental inductance of the signal winding, that is, its inductance effect in the presence of an alternating signal current. In operation each signal winding usually is connected into a circuit which is controlled by varying the effective inductance values of the signal winding in response to variations in the degree of magnetic saturation produced by a control flux in the signal core portion. The magnitude of this control flux is controlled by a control current flowing through a control winding electromagnetically coupled to a control flux path which extends through the signal core portion. As the control current is increased, the degree of magnetic saturation of the signal core portion increases, reducing its permeability and thereby reducing the effective incremental inductance of the signal winding. When the control current is reduced or the magnetic saturation of the signal core portion is otherwise decreased, the inductance of the signal winding increases.

In controllable inductors of the foregoing type, it is advantageous to have means for adjusting the effective inductance of each signal winding at any given value of control flux. There are several reasons for this. It is commercially impractical to attempt to reproduce the signal core portions and windings during mass production of controllable inductors with such exact precision that each will be affected in exactly the same manner by a control flux and will have exactly the same characteristics.

The slight differences between various signal core structures resulting from mass production are particularly significant in certain integrated applications of multi-element controllable inductors, that is, in such inductors having a plurality of signal windings which are controlled by a common control winding. In such integrated circuits a plurality of signal windings are controlled by common control winding means and are components of companion or mutually co-operating controlled circuits, such as the co-operating tuned circuits in a radio receiver. In such integrated apparatus it is important that the tuning of the various circuits "track" along together. That is to say, the several circuits should have substantially identically shaped curves of inductance versus control current or other correlated characteristics which follow along together so as properly to "track" each other to produce the desired mutual co-operation.

Heretofore, it has been common practice in some instances to use supplemental windings to adjust the effective inductance of each signal winding circuit at pre-selected control current values, whereby to achieve the desired correlation between the several tuned circuits in the system.

Among the further advantages of the present invention are those resulting from the fact that certain requirements for supplemental inductance-modifying circuit components in conjunction with the controllable inductor are eliminated by suitable adjustments of one or more of the variable air gaps in the magnetic flux path or paths in the controllable inductor. These provide adjustment of the effective inductance values of the inductor at any given value of control flux.

The present invention is in the nature of a further improvement over the subject matter of my prior copending applications Serial No. 425,244, filed April 23, 1954, now Patent No. 2,869,087, issued January 13, 1959; Serial No. 445,146, filed July 22, 1954; Serial No. 464,425, filed October 25, 1954; and over a copending application of Ellery P. Snyder, Serial No. 637,505, filed January 31, 1957, now U.S. Patent No. 2,911,529, issued November 3, 1959.

In this specification and in the accompanying drawings, are described and shown illustrative embodiments of the apparatus of my invention and various modifications thereof are indicated, but it is to be understood that these are given for purposes of illustration in order that others skilled in the art may fully understand the invention and the manner of applying the apparatus in practical use so that they may modify and adapt it in various forms, each as may be best suited to the conditions of a particular use.

A more complete analysis of the present invention and its various features and advantages will be found in the following description of illustrative embodiments thereof, which is to be read with reference to the accompanying drawings, in which:

Figure 1 is a perspective view of an improved controllable inductor embodying the present invention, with portions of one of the horseshoe-shaped spring retaining clips being shown broken away more fully to reveal one of the adjusting screws;

Figure 2 is an elevational view as seen looking at the controllable inductor of Figure 1, in the direction of the arrow 2, and being shown on somewhat enlarged scale;

Figure 3 is a top view of the controllable inductor of Figures 1 and 2;

Figure 4 is a partial cross sectional view taken along the line 4—4 of Figure 3, and shown on considerably enlarged scale, and showing a pair of adjusting screws and the positioning of one of the signal core and winding assemblies with respect to the control winding and yoke structure;

Figure 4A is a partial cross sectional view taken along the line 4A—4A of Figure 4 looking up and showing the co-operation between the fixed abutments and the end of the supporting tray for the signal core structure;

Figure 5 is a perspective view of the front face of one of the supporting trays from the controllable inductor of Figures 1–3 and showing the signal core portion of the structure and its adjusting screw carried by the tray support;

Figure 6 is a perspective view of the back of the tray support of Figure 5;

Figure 7 is a schematic illustration of the tray support, signal core structure, and adjusting screw of Figures 5 and 6 for purposes of explanation of their co-operating functions;

Figure 8 is a perspective view of a modified form of tray support holding a signal core portion and signal winding therein;

Figures 8A and 8B show the bow-shaped locking clip utilized to hold the signal core structure in place;

Figure 9 is a plan view of a blank form of a nonmagnetic metal sheet which is bent to form the supporting tray of Figure 8;

Figure 10 is a perspective view of another modified form of tray support holding a signal core structure therein;

Figure 11 is a cut-away perspective view of a different form of controllable inductor embodying the present invention wherein three tray supports and signal core structures are shown spanned across between the legs of a C-shaped laminated yoke structure, with the common control winding surrounding these three signal core and winding assemblies;

Figure 12 is a cut-away perspective view of a different form of controllable inductor embodying the present invention wherein the laminated yoke structure is oval-shaped with three signal core units spanned across between opposite legs of the oval yoke;

Figure 16:
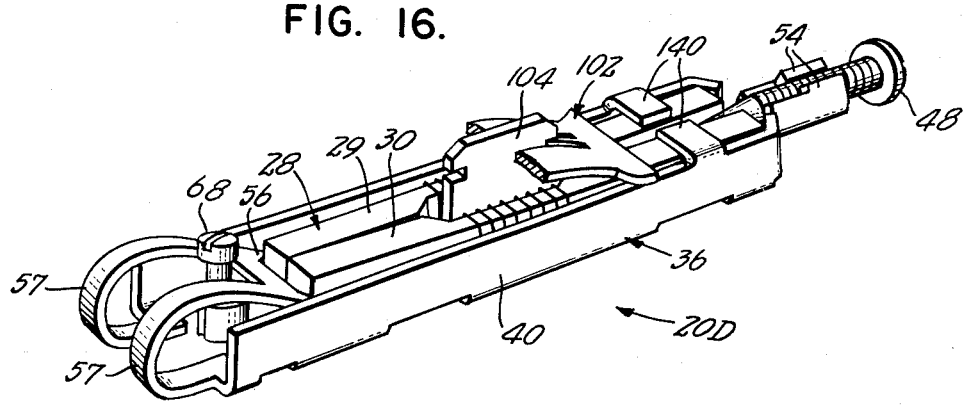
Figure 17:
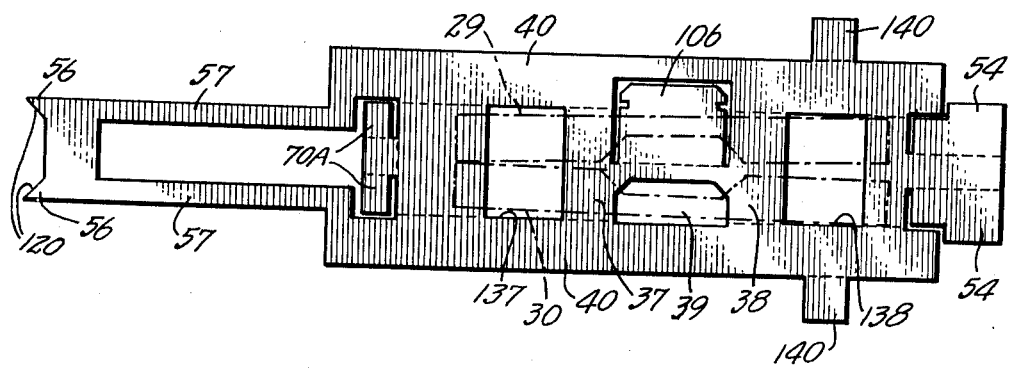
Figure 18:
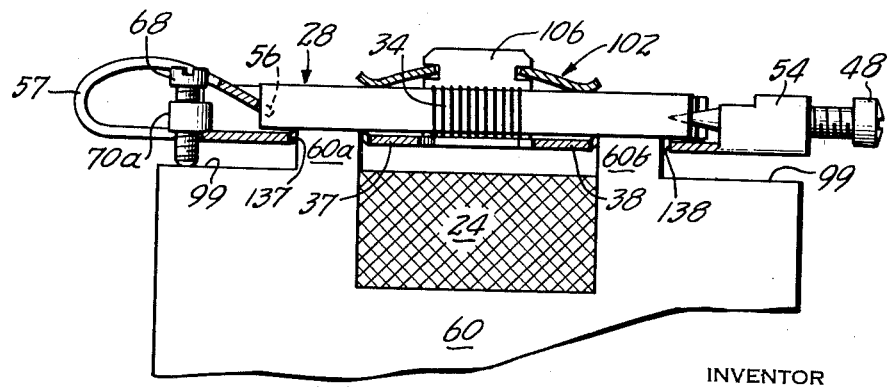

Figures 13, 14, and 15, are partial perspective views of three modified forms of adjusting screw mounts;

Figure 16 is a perspective view of a modified form of tray support carrying a signal core portion and its signal winding;

Figure 17 is a plan view of a blank form stamped from a non-magnetic metallic sheet which is bent to form a modified tray support as shown in Figure 16; and Figure 18 is a partial cross-sectional view of a modified form of controllable inductor showing an arrangement different from that shown in the view of Figure 4, both adjusting screws being carried by the tray support.

The controllable inductor illustrated in Figures 1 through 6 includes three removable signal core and winding assemblies, generally indicated at 20, 21, 22, respectively, each controlled by common control means shown in the form of a common control winding 24 surrounding all three assemblies. A rectangular bobbin 25 of rigid insulation material including a pair of end flanges 26 supports the control winding.

The three removable signal core and winding assemblies 20, 21, and 22 are identical in construction, with the possible exception of the arrangement of and number of turns of the signal windings, so that only one of these assemblies 20 will be described in detail. As shown in Figures 5 and 6, the assembly 20 includes a signal core part or portion 28 formed by two identical pieces of magnetically permeable and readily saturable material, for example, such as a ferromagnetic ceramic material, usually called "ferrite," as shown at 29 and 30. Each of these pieces of ferrite is provided with a trapezoidal shaped notch so that an elongated hexagonal slot or opening 32 is formed when the two pieces are placed in face-to-face relationship. This arrangement provides a convenient method of forming the opening 32 and for carrying the signal winding, but other methods of construction may be used.

The signal winding 34 is formed in two halves 34a and 34b, one half being wound closely about the notched portion of the ferrite rod 29, and the other half being wound closely about the notched portion of the ferrite rod 30. These two winding portions 34a and 34b are connected in series in such manner that any alternating flux induced in the rods 29 and 30 flows in a closed path 35 around the opening 32 in a manner such as indicated by the arrows 35 in Figure 7. This arrangement minimizes coupling through the common control means between the various signal windings and the control winding 24 and also minimizes coupling between the individual signal windings themselves.

In order to support the ferrite pieces 29 and 30, an elongated tray support 36 is provided, formed from a non-magnetic material. In this illustrative embodiment, the tray support is shown as formed from a pre-cut non-magnetic sheet metal blank which is then bent up into its final tray shape, for example, being brass or aluminum. This elongated tray support includes a bottom surface having two planar regions 37 and 38 (Figure 6) near opposite ends, which serve to support the opposite ends of the ferrite pieces. The center portion of the bottom of this tray is cut away at 39 so as to reduce stray capacitance effects between the turns of the windings and the material of the tray. Opposite edges of the blank are bent up perpendicular to the bottom to form reinforcing flanges 40 extending the full length of the tray.

To retain the core pieces 28 and 29 in place, a U-shaped wire clip 42 (Figure 6) is used having a pair of arms extending along opposite edges of the opening 39. The ends 43 of this wire clip overlap a portion 44 of the bottom surface of the tray spanned across between the side flanges. Bent tabs 45 (Figure 5) of this clip 42 extend up through a pair of openings 46 between the area 36 and the spanning portion 44, urging the core pieces 29 and 30 toward each other. These tabs also curl inwardly at their ends so as urge these two core pieces downwardly firmly against the planar areas 37 and 38.

In order positively to establish the longitudinal positioning of the two ends of the core pieces 29 and 30 with respect to non-magnetic gap adjusting means including a screw 48, the portions of the blank which are struck out to form the pair of openings 46 are bent up to provide a pair of fixed abutments 50. Thus, as seen even more clearly by reference to the diagrammatic illustration of Figure 7, the two ends 51 and 52 of the core pieces 29 and 30, respectively, can not move longitudinally with respect to the end of the tray 36 near the adjusting means.

As shown in Figure 7, the wire clip acting through its tabs 45 provides a spring force urging these two ends 51 and 52 together against the wedging action of the pointed end 53 of the screw 48 inserted between them. In most cases, the separation of the ends 51 and 52 is but a few hundredths of an inch or less, but in Figure 7 this is exaggerated for purposes of explanation. The screw 48 is held between a pair of opposed fingers 54 bent up from the blank and squeezed against opposite sides of the screw. Thus, advantageously, threaded areas are cold-forged in the inner faces of these fingers enabling rapid inexpensive manufacture of these assemblies 20, 21, and 22. These fingers firmly grasp the screw and enable it to be screwed in or out, as may be desired, to increase or decrease the non-magnetic gap 55, shown as an air gap between the ends 51 and 52. In this way the reluctance in series with the closed path 35 passing around the signal core opening 32 is adjusted.

Against the other ends of the core pieces 29 and 30 are urged the ends 56 (Figure 5) of a resilient strip 57 which is held in place by a bight 58 at its center gripped between another pair of fingers 59. This spring strip 57 urges the two core pieces firmly against the abutments 50 and also urges their adjacent ends firmly together by acting inwardly at an angle on the outer corners of the core pieces 29 and 30 as indicated most clearly in Figures 5 and 7. This spring strip 57 is of non-magnetic material such as berrylium-copper or Phosphor-bronze.

Among the many advantages of this arrangement of the fixed abutments 50 adjacent to the ends 51 and 52 near the adjusting means are those resulting from the positive longitudinal positioning with respective to the tray support. Any changes in dimensions of the core pieces 29 or 30 with respect to the tray 36, for example, due to differential rates of expansion with changes in temperature, are accommodated by the resilience of the spring 57 at their other ends.

Associated with each of the signal core and winding assemblies 20, 21 and 22 and forming a portion of the control means are three C-shaped laminated control yoke structures 60, 61, and 62, respectively. These control yoke structures are identical in construction, and each includes a stack of C-shaped laminations (Figure 4) of magnetically "soft" material, such as transformer iron or silicon steel, which straddle the common control winding 24 and bobbin 25. Both flanges 26 of the bobbin are notched at three aligned positions, for example as seen in two of the three pairs of places, at 64 and 65 (Figure 1) so as to receive and help position these three yoke structures 60, 61, and 62.

As seen best in Figure 4, each of these lamination stacks, such as that shown at 60, provides a pair of spaced pole legs 60a and 60b adjacent to the opposite ends of the signal core portion 28. Thus, control current flowing in the winding 24 induces control flux following a closed control flux path indicated by the dotted arrows 65. This control flux path passes along substantially the full length of the core portion 28 (see Figure 7) and passes through an adjustable non-magnetic gap 66, shown as an air gap, in series with the control flux path 65.

In order to adjust this gap 66, second adjusting means are provided including an adjusting screw 68 held firmly between opposed pairs of bent-up tabs or fingers 70 and 72, respectively. These fingers are squeezed against the screw 68 so as to cold forge threaded areas in their adjacent faces. Thus, the screw 68 can be turned in against the end tab 59 of the tray support to adjust this gap 66.

Identical adjusting means including screws 74 and 76 are provided for the signal core and winding assemblies 21 and 22. The pairs of fingers 70 and 72 are bent up from a top rectangular end plate 78 of non-magnetic sheet material. As shown, the top plate 78 is of metal, such as brass or aluminum. A rectangular bottom plate 79 is of rigid plastic insulation material whose corners carry four pairs of terminals 80, for the control winding 24 and for the three signal windings. Each of these end plates 78 and 79 has a central window 82 and 83, respectively. Through the upper window 82 extend the tray tabs 59 so as to engage the adjusting means 68, 74, and 76, and through the lower window 83 project the adjusting means 48 so as to be readily accessible.

In order to form a flux umbrella at each end of the controllable inductor, a pair of laminations 85 and 86 are positioned as shields directly beneath the end plates 78 and 79. These also include central windows generally aligned with those in the end plates. Their corners are cut off at 45° to provide clearance for the terminals 80. Thus, any stray flux tending to pass axially through the signal cores 28 is diverted by these umbrella shields 85 and 86 so as to flow through the yokes 60, 61, and 62 where the stray flux has little influence upon operation of the controllable inductor.

In order to hold the laminated yokes 60, 61, and 62 together and to align the removable signal core units 20, 21, and 22 therewith, these yoke structures each include a pair of non-magnetic clamping plates 88 and 89 held firmly against opposite sides of the lamination stacks by means of bolts 90. These clamping plates are formed of sheet brass or aluminum and their edges project inwardly beyond the pole faces 60a and 60b effectively forming pockets to receive the units 20, 21, and 22. At their upper and lower ends, the two side flanges 40 of the tray supports snugly fit between the projecting edges of the yoke clamping plates 88 and 89 thus centering the ends of core portions 28 with respect to the yoke legs 60a and 60b.

The lowest portion (see Figure 4A) of the clamping plates 88 and 89 include knees 92 bent inwardly to form a confined pocket for the fingers 54 and screw 48. These knees 92 also provide fixed abutments against which is lodged the spanning portion 44 of the tray 36 so as to prevent longitudinal shifting of the signal core assembly with respect to the pole legs 60a and 60b.

For purposes of holding the core 28 firmly against the pole 60b, a U-shaped wire clip 94 has a bight which passes through slots in the lower edges of the clamping plates 88 and 89 just above the knee bends 92. These clips 94 (see Figures 1 and 2) have their outer ends 95 hooked into notches in the outer edges of the clamping plates 88 and 89 both of which extend out beyond the respective backs of the laminations 60, 61, or 62.

In order to fasten the controllable inductor together, the three pairs of clamping plates 88 and 89 include projecting lugs 96 extending out through slits in the shield plates 85 and 86 and through the end plates 78 and 79, respectively, with the outer ends of these lugs twisted and bent over to prevent withdrawal.

Horseshoe-shaped spring clips 97 resiliently urge the trays 36 firmly down against the abutments 92 and against the ends of the respective screws 68, 74, and 76. Their ends are bent in to grip the top plate 78 and shields 85 and 86, being readily removable at will.

The ferrite or ferromagnetic ceramic material in the core portions 28 may be similar to that disclosed by Snoek in U.S. Patents Nos. 2,452,529; 2,452,530; and 2,452,531. The signal flux in the path 35 is alternating in nature, but the control flux is a generally unidirectional flux whose value is varied only as necessary to regulate the degree of magnetic saturation of the signal core portions 28 of the three signal core and winding assemblies 20, 21, and 22 traversed by the signal winding flux 35.

By virtue of the fact that the effective permeability of the ferrite material in the signal cores decreases with an increase in the degree of its magnetic saturation produced by the control flux, the inductance of the signal windings 34 is changed in accordance with the amount of control current flowing in the control winding 24. Because the three signal core and windings assemblies 20, 21 and 22 are bridged across between their respective pole pieces of the yoke structures 60, 61, and 62 and are subjected to substantially equal amounts of control flux, the inductance values of the three signal windings change correspondingly as the control current is changed.

Among the advantages of the illustrative embodiment of the present invention, are those resulting from the fact that the adjusting screws 48 and 68, 74, and 76 enable quick and convenient adjustment of the effective inductance value of each individual signal winding for any given value of control flux. Thus, in accordance with the invention each signal winding can be adjusted precisely to the same or to predetermined different inductance values, as desired, for predetermined values of the control current.

The signal flux series gaps 55 have the effect of reducing the inductance of the respective signal windings 34. This adjustment action has more proportionate effect at low values of the control current, that is, when the permeability of the cores 28 is highest, because the unity permeability of the gap is then in greatest contrast to the permeability of the core pieces 29 and 30.

Varying the gap 55 has an effect which is analyzed as follows: This gap has a cross sectional area "A" perpendicular to the direction of the flux 35 as it crosses the gap. The effective cross sectional area of the signal flux path 35 in the ferrite is "B." This signal flux path in the core 28 has been an effective length "c" which is the combined lengths of the two notched portions. The permeability of the ferrite rods 29 and 30 is "$\mu$" and, of course, the permeability of the gap is unity.

The inductance "$L_0$" with no air gap is proportional to the product of ferrite cross sectional area times ferrite permeability divided by ferrite path length.

(1) $$L_0 \propto \frac{B\mu}{c}$$

The inductance "$L_s$" with an air gap is inversely proportional to the sum of the reluctances of the ferrite path plus air gap path (2) $$\frac{1}{L_s} \propto \frac{c}{B\mu} + \frac{s}{A} = \frac{sB\mu + cA}{AB\mu}$$

where $s$ is the spacing at 55.

Thus, the ratio of inductance without air gap to inductance with air gap is determined by the following expression (3) $$\frac{L_0}{L_s} \propto \frac{sB\mu + cA}{cA}$$

In a particularly successful embodiment of this inductor each ferrite piece 29 or 30 is a rod ⅛ of an inch square in cross section at each end and is 1⅛ inches long. The notch is centrally located and occupies one-third the length of the core piece, being ⅜ of an inch long. The ends of the notch taper down at a 45° angle with respect to the length of the rod, and the notch has a depth of approximately one-half the thickness of the rod, being approximately 1/16 of an inch deep. Thus, each notch is about ¼ of an inch long as measured along its bottom surface. The reduced portion of the rod at the notch has a rectangular cross section of dimensions .125 by .060 of an inch. The surfaces of the two rods 29 and 30 at the gap 55 are ⅛ of an inch wide and ⅜ of an inch long, thus providing a cross sectional area "A" at the air gap of aproximately .047 square inch. The effective cross sectional area "B" of the signal flux path 35 in the ferrite is primarily determined by the cross sectional area along the two notched portions, each of which is .125×.060, or .0075 square inch and its effective length is about .5 of an inch.

At low values of control current, in this example, the value of $\mu$ is about 200. Thus, to reduce the effective inductance of the signal winding to, say, one-half the value occurring when no gap is present, the spacing "$s$" is calculated:

(4) $$\frac{2}{1} \propto \frac{sB\mu + cA}{cA}$$

Thus, (5) $$s = \frac{cA}{B\mu} = \frac{.5(.047)}{(.0075)200} = .0157 \text{ of an inch}$$

Varying the gap 66 has the effect of varying the rate at which the inductance of the signal winding changes with respect to a given change in control current. Thus, if it is desired to have the inductance of one of the signal windings vary more slowly with changes in control current, the respective adjusting screw 68, 74, or 76 is turned to increase the gap 66 for that signal winding with respect to the others.

As mentioned above, adjustment of the gap 55 has an effect which predominates during the condition of high signal winding inductance, which also corresponds to a condition of low signal core saturation. That is, when a low density of control flux 65 is present, the signal flux series gap adjusting screws 48 are most effective in their control action in adjusting the value of signal winding inductances obtained for a given value of the control flux 65. Thus, during conditions of low control flux density, the effective inductance of the signal winding is primarily influenced by the air gap in the signal flux loop (i.e., the gap 55 between the ends of the core pieces 29 and 30) and is substantially insensitive to gap changes at 66 in the control flux path 65.

On the other hand, the condition of low signal winding inductance corresponds to a substantial amount of signal core saturation as produced by a high density of control flux 65. At this end of the control curve, the second air gap 66 which is in series with the control flux path is predominant in adjusting the values of effective signal winding inductance obtained by a given density of control flux. The air gap 55 between the ends of the core pieces has only a negligible effect when a substantial amount of signal core saturation is present because the high saturation of the core pieces 28 and 29 decreases their permeability to such a relatively low value. Thus, the presence of the non-magnetic gap in series with the signal flux path 35 has only a negligible effect at high values of control current in view of the large reduction in permeability of the core pieces 28 and 29 already present. Thus, it is seen that the adjustment means of the present invention provide great flexibility of control over signal winding inductance by acting at opposite ends, i.e., at both the high and low ends of the control flux curve.

In addition to enabling the adjustment of these gaps as previously described, the resilient mounting provided by the springs 94 and 97 pressing the support 36 against the abutment 92 also serves to prevent permanent displacement of the tray structure due to shock or vibration. Similarly, the action of the springs 45 and 57 in pressing the core pieces against the abutments 50 prevents permanent displacement of the core pieces with respect to the tray. Abutments 92 and 50 are closely adjacent and form a focal point for orienting the core 28 longitudinally with respect to the pole legs 60a and 60b. The side clamping plates 88 and 89 always assure proper lateral positioning of the signal core 28 with respect to the poles 60a and 60b. The notch at 99 in the lower pole leg 60b provides clearance for the tabs 54.

Advantageously, the inductances at both the high and low ends of the control flux curve for all three signal windings can quickly and individually be adjusted either before or after the parts are completely assembled and the controllable inductor is fully installed ready for use. Each individual signal winding can be properly adjusted after installation and after all connections to the controllable inductor have been completed.

In setting up a tunable resonant circuit to enable controlling the resonant frequency across a predetermined range or band of frequencies, in accordance with prior art practice the first step is to determine the proper size of condenser to resonate with each winding at the center of the frequency band when the effective signal winding inductance is at an intermediate value. For example, assume that a superheterodyne radio receiver is being tuned by an inductance winding. It is then customary to vary the winding so as to produce its maximum and minimum inductance values, and to bring the resonant frequency of the circuit into correspondence with the desired "end points" of the frequency band by means of so-called trimming and padding circuit elements suitably connected in series or parallel with the original circuit components. In this way, so-called "three-point" tracking is obtained, whereby the resonant frequency exactly coincides or exactly tracks with the desired values at three points across the range. Two of the points occur near opposite ends of the range and one near the center of the range. Under these circumstances, the tuning of the circuit usually follows the desired control curve closely enough throughout the remainder of the range so as to given acceptable correspondence between actual and desired characteristics.

Among the many advantages of the improved controllable inductors of the present invention are those resulting from the fact that they provide easy adjustment in obtaining three-point tracking of tuned circuits utilizing such inductors. In operating these improved controllable inductors, the low frequency end of the tuning range is adjusted by suitable adjustment of the gap 55 in series with the signal flux path 35.

The adjustment at the high frequency or high control flux end of the curve is obtained by adjusting the gap 66 in series with the control flux path 65.

Advantageously, it is seen that the adjustment provided by the variable gap structures of the present invention greatly simplifies the three-point alignment procedure. This desirably results because the necessary adjustments can be made by incremental variation of the gaps either before final assembly of inductor or with all of the circuit components and with the controllable inductor completely installed ready for use.

In a typical inductor of the type shown in Figures 1–6, the control winding 14 is formed of 5,625 turns of #35 AWG enameled wire. The three signal windings 34 are formed of various numbers of turns of #35 AWG enameled wire, or the like, depending upon the frequencies of operation. For example, for controlling a standard broadcast receiver of the superheterodyne type, the signal winding portions 34a and 34b controlling the oscillator each comprises a single layer winding of 22 turns of #32 AWG enameled wire. The signal winding portions controlling the input from the antenna each includes 75 turns of #35 AWG enameled wire, and the signal winding portions controlling the radio frequency amplifier included 35 turns of #35 AWG enameled wire. From the foregoing exemplary dimensions, it will be understood that the various figures of the drawings are drawn on a considerably enlarged scale for purposes of clarity. Actually, a completely assembled improved controllable inductor can be encompassed within a box space less than 2½ inches long and about 2¾ inches by 2¾ inches in width and depth.

In the modified signal core and winding assembly 20A of Figures 8 and 9, parts performing functions corresponding to those of earlier figures have corresponding reference numerals, and similarly with the figures described hereinafter. The signal core pieces 29 and 30 are held down against planar areas 37 and 38 by means of a resilient bow clip 102 (Figures 8A and 8B) which is snapped into recesses 104 in an upstanding web 106 of the tray support 36. This bow clip has an elongated central opening 108 and two inwardly projecting tabs 110 adapted to engage in these recesses 104.

In order to urge the ends 51 and 52 of the signal core rods 29 and 30 toward each other, and against the conical point of the screw 48, a pair of L-shaped legs 45 extend up from the bottom surface area 38 and along the two sides of the tray 36. Their free ends are curved in to provide a resilient spring force.

For purposes of holding the other ends of the core pieces 29 and 30 together an end portion of the tray is curled back over itself in a loop, forming resilient spring means 57. Two ears 56 on the end of this spring means have inwardly converging faces 112 which engage the adjacent outer corners of the core pieces 29 and 30 so as to cam them together. Also, spring means 57 urges the ends 51 and 52 of the core pieces against a pair of abutments 50 formed by flag-shaped lugs of the tray blank 36 which are bent up from the planar bottom 38 and then bent in at their ends. An elongated cutout 114 between the two legs of the spring means 57 increases the resilience and leaves a finger 59' which engages the respective adjusting screws 68, 74 and 76 when assembled in the inductor.

A second pair of L-shaped legs 116 extend up from the bottom surface area 38 and run along both sides of the tray 36 toward the central part near the web 104. These legs 116 include toes 118 which are bent over the core pieces 29 and 30 and help hold them in place in the support 36.

It will be appreciated that the modified signal core and winding assembly of Figures 8 and 9 also is well adapted for use in the controllable inductor of Figures 1–4A. In Figure 4, the chamfered region 120 of the upper pole leg 60a provides clearance for the loop spring 57. The open area 39 in the tray support 36 provides clearance for the signal winding portion 34b and reduces stray capacitance between this winding and the tray. When the web 106 is bent up, a similar open area is provided on the other side for the signal winding portion 34a.

In the modified signal core and winding assembly 20B of Figure 10, the signal core portions and windings are identical with those in Figures 5 and 8. One difference between units 20B and 20A lies in the first pair of legs 45, which here also include a pair of toes 122 overlapping the core portions 29 and 30 near the signal winding portions 34a and 34b to hold them down against the bottom planar area 38 of the tray 36. Another difference is the spring means 57 provided by cut-out weakened portions of a pair of ears 56 that are bent inward at an angle to engage the outer corners of the adjacent ends of the core pieces 29 and 30, thus camming them together and urging them against the fixed abutments 50.

To provide clearance for the signal winding portions 34a and 34b, the area 124 of the bottom of the tray, between the planar areas 37 and 38 is depressed by an amount more than the thickness of the sheet metal of the tray.

In the controllable inductor of Figure 11, only a single laminated C-shaped yoke structure 60 is employed having a pair of pole legs 60a and 60b. Three signal core and winding assemblies 20C, 21C, and 22C are spanned across between these pole legs 60a and 60b. As shown the unit 20C is spanned across the ends and 21C and 22C is across the sides of the pole legs 60a and 60b. These units 20C, 21C, and 22C are identical with the unit 20B in Figure 10, except that the adjusting screws 68, 74, and 76 for the non-magnetic gaps in series with the control flux path are carried between pairs of opposed fingers 70A. These fingers 70A are cold forged into engagement with the threads of the screw 68 by squeezing them together, for example by pliers. They project from opposite sides of a neck portion 129 which is connected to the planar bottom area 37 and is bent perpendicularly to this area 37.

Among the advantages of this arrangement are those resulting from the fact that both gap adjustments can be made against a standard control winding and yoke prior to their positioning in the controllable inductor. Abutment means engaged by the adjusting screws 68A are provided by projections 130 on a plurality of centrally located laminations in the stack.

Notches 64 in the flanges 26 of the spool 25 for the control winding serve to hold the legs 60a and 60b of the yoke structure 60 properly aligned with the axis of the opening in the control winding.

In the controllable inductor of Figure 12, the yoke structure 60A has an oval form including a pair of legs 60a and 60b forming spaced poles across which the control and signal winding units 20C, 21C, and 22C are spanned. Abutment means engaged by the adjusting screws 68, 74, and 76 are provided by projections 130 on a plurality of the centrally located laminations in the stack.

In Figure 14, the adjusting screw 68 extends through a hole 132 in a straight neck portion 129A connected to the bottom area 37 (not shown) and in the same plane therewith. The opposed fingers 70A have threaded inner faces formed as described above.

In Figure 15, the adjusting screw 68 is held by a U-bend in the end 134 of the neck 129, also extending through a hole 132. Threaded surfaces are formed as before on the inner faces of the end 134.

In the modified signal core and winding assembly 20D of Figures 16 and 17, the two side flanges 40 extend the full length of the tray support 36. Between the planar bottom areas 37 and 38, is a central clearance opening 39 for the signal winding which reduces any stray capacity between the tray and winding. When the web 106 is bent up from the blank, a corresponding winding clearance opening is provided on the other side of the web 104 from the opening 39.

Also, pole face engagement openings 137 and 138 are cut in these planar areas 37 and 38 so that the bottom of the tray 36 can be placed against the legs 60a and 60b of a control yoke structure 60 as shown in Figure 18 with engagement between the pole legs and signal core 28 occurring through the openings 137 and 138. The adjusting screw 68 engages a notched region 99 in the leg of the yoke structure. This adjusting screw is held by a pair of fingers 70A similar to those shown in Figure 13 except that the adjusting screw 68 is reversed in direction with respect to the bottom surface of the tray. A pair of ears 140 project up from the sides of the tray 40 and help hold the signal core 28 in position.

In Figures 1–4, the function of the wire clip 94 can be replaced by encircling rubber bands running through the aligned pairs of notches 141 and 142 in the inner and outer edges of the clamping plates 88 and 89.

From the foregoing it will be understood that the embodiments of the apparatus of the present invention described above are well suited to provide the advantages set forth, and since many possible embodiments may be made of the various features of this invention and as the controllable inductor apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:

1. An adjustable controllable inductor comprising electromagnetic control means and a signal winding of which the effective inductance is controlled by said electromagnetic control means and wherein the inductance of the signal winding can be mechanically adjusted and the signal winding can be away from the presence of said electromagnetic control means while maintaining the adjustment, said electromagnetic control means including a pair of spaced pole regions, a removable signal core and winding assembly extending between said pole regions, said removable signal core and winding assembly including a tray support, a signal core portion carried by said tray support and having magnetically saturable material therein and a signal winding operatively associated with said saturable material and magnetically coupled to said saturable material, said signal core portion defining a signal flux path for magnetic flux associated with said signal winding, said signal core portion defining an adjustable non-magnetic gap in said signal flux path, manually operable adjustment means carried by said tray support for adjusting said non-magnetic gap, and detachable fastening means removably securing said assembly in position extending between said pole regions, whereby said removable signal core and winding assembly including said signal winding can be moved with respect to said electromagnetic control means and the adjustment of said adjustment means will retain its value while said assembly is being moved with respect thereto.

2. An adjustable controllable inductor for simultaneously controlling the inductance of a plurality of signal windings comprising a control winding having an opening therethrough, a plurality of non-magnetic supports extending within said opening, a plurality of signal-winding core portions each supported by one of said supports and extending within said opening, each said core portion including a pair of magnetically permeable core pieces, an adjusting screw carried by each of said supports for adjusting the spacing between the core pieces of the associated core portion, a plurality of signal windings, one carried on each of said signal-winding core portions, magnetically permeable pole structure near the opposite ends of said control winding, and magnetically permeable core means associated with said pole structures extending outside said winding providing a flux path between said pole structures.

3. An adjustable controllable inductor as claimed in claim 2 wherein each of said non-magnetic supports includes spring means urging said core pieces toward each other against the action of the adjusting screw carried by the support.

4. An adjustable controllable inductor comprising a control winding, magnetically permeable means defining pole regions near opposite ends of said winding, a plurality of supports of non-magnetic material movably mounted in said inductor and extending between said pole regions, each of said supports carrying a signal winding core, said pole regions and said signal winding cores co-operating to provide a plurality of parallel paths for control flux induced by current flow through said control winding, each said signal winding core comprising a plurality of permeable members arranged to define a closed loop signal flux path, a signal winding coupled to each said closed loop flux path, first adjusting means carried by each of said supports and mechanically interacting with two of said permeable members in each said signal winding core for varying the spacing between said two members for adjusting a variable air gap in each said closed loop signal flux path, and second adjusting means in said controllable inductor for adjusting the position of at least one of said supports with respect to at least one of said pole regions.

5. An adjustable controllable inductor as claimed in claim 4 and wherein said second adjusting means are carried by each of said supports.

6. An adjustable controllable inductor as claimed in claim 4 and wherein said second adjusting means comprises screw mounting means in said controllable inductor fixed in position with respect to said pole regions, and a plurality of adjusting screws held by said mounting means and each engaging one of said supports for adjusting the position of said support with respect to at least one of said pole regions.

7. An adjustable controllable inductor as claimed in claim 4 and wherein said inductor includes first abutment means fixed in position with respect to said pole regions, and each of said supports includes second abutment means therein closely adjacent to said first abutment means for locating said permeable core members in position on each support.

8. A controllable inductor including magnetically permeable control core apparatus defining a pair of spaced pole regions, control winding means creating a magnetic field between said spaced pole regions, an elongated signal core portion extending between said pole regions, a signal winding coupled to said signal core portion, and a pair of flux umbrellas at opposite ends of said elongated signal core portion each comprising at least two flat laminations of magnetically permeable material extending perpendicularly to the longitudinal axis of said signal core portion and each flux umbrella being positioned close to said control core apparatus.

9. A controllable inductor as claimed in claim 8 and wherein said control winding means surrounds said signal core portion and said spaced pole regions are at opposite ends of said control winding means, and each of said flat plates extends out beyond the circumference of said control winding.

10. An adjustable electrically controllable inductor for controlling the inductance of a plurality of signal windings comprising a control winding having an opening therethrough, magnetically permeable core apparatus having pole legs adjacent opposite ends of said winding, a plurality of elongated tray supports of non-magnetic material spanned between said pole legs and extending through said opening, each tray support carrying a pair of elongated signal core pieces extending along said tray through said opening, a signal winding portion on each of said core pieces, means movably mounting said core pieces on each of said tray supports, and an adjusting screw carried at one end of each tray support having a pointed end inserted between the ends of the pair of core pieces on its tray support.

11. An adjustable controllable inductor as claimed in claim 10 and wherein each of said tray supports includes means at the opposite end thereof from the adjusting screw resisting movement of said core pieces away from said adjusting screw, and the adjusting screw extends in a longitudinal direction of the tray support directed toward said movement resisting means.

12. An adjustable controllable inductor as claimed in claim 10 and wherein each said tray support includes a web projecting between said core pieces and a spring clip on the web pressing said core pieces against said tray support.

13. An adjustable controllable inductor including magnetically permeable components defining spaced pole legs having spaced pole faces lying in a common plane, control winding means for creating a magnetic field between said pole faces, a plurality of movable rigid supports bridged across between said pole faces, resilient fastening means urging said supports toward said pole faces, a signal core portion carried by each of said supports and each including magnetically saturable material, a signal winding carried on each of said supports responsive to the saturable material, abutment means in said controllable inductor fixed in position with respect to said pole faces and an adjusting screw carried by each of said supports and engaging the abutment means for moving said support away from at least one of its pole faces against the force of said resilient fastening means.

14. A controllable inductor as claimed in claim 13 and wherein said magnetically permeable components include a plurality of laminations and said abutment means are provided by portions of said laminations offset from said pole faces.

15. An adjustable controllable inductor including a common control winding having an opening therethrough, a plurality of magnetically permeable C-shaped laminated yoke portions having spaced legs near opposite ends of said opening, each yoke portion including a pair of non-magnetic clamping plates held against opposite sides of each of said yoke portions, said pairs of clamping plates having edges projecting beyond said spaced legs and defining pockets adjacent to the faces of said legs, a plurality of non-magnetic tray supports having sides spaced apart distances commensurate with the spacing between the projecting edges of respective pairs of said clamping plates, each of said tray supports extending through said opening of the control winding and being spanned across between the spaced legs of one of said C-shaped yokes with the sides of said tray supports restrained by the projecting edges of the pair of clamping plates associated therewith, each tray support carrying magnetically saturable signal core means and a signal winding associated therewith, resilient retaining means urging each tray support toward the associated spaced yoke legs, and adjusting means for moving each tray support away from at least one of the associated spaced yoke legs against the force of said resilient retaining means.

16. An adjustable controllable inductor as claimed in claim 15 and wherein parts of the edge portions of each pair of said clamping plates are bent toward each other to provide abutment means and said tray supports each include parts adapted to engage said abutment means to position the tray supports longitudinally with respect to said pole legs.

17. An improved controllable inductor including electromagnetic control means, a plurality of signal core and winding assemblies, each assembly including an elongated tray support of non-magnetic material having a pair of support areas one near each end, a pair of elongated pieces of magnetically saturable material, a winding portion around each elongated core piece near its center, said elongated core pieces resting side-by-side in the tray support with the opposite ends of said elongated core pieces engaging said support areas, first resilient retaining means urging said core pieces against said support areas, said tray support providing clearance between said support areas for said winding portions, and second resilient retaining means securing said tray supports in position with respect to said electromagnetic control means.

18. An improved controllable inductor as claimed in claim 17 and wherein said support areas near opposite ends of said elongated tray are coplanar and said elongated core pieces are rods having regions of reduced cross sectional area near their centers, and said winding portions surrounding said regions of reduced cross sectional area.

19. An improved controllable inductor as claimed in claim 17 and wherein said clearance between said support areas includes an opening in said tray support adjacent to each of said winding portions.

20. An improved controllable inductor as claimed in claim 18 and wherein said tray support is formed of non-magnetic electrically conducting material and clearance for said winding portions is provided by a depressed region of said tray support between said support areas.

21. An improved controllable inductor as claimed in claim 17 and wherein said tray supports are of non-magnetic electrically conductive sheet metal and include edge flanges bent up substantially perpendicular to said support areas.

22. A controllable inductor as claimed in claim 26 and wherein each of said tray supports is formed of resilient non-magnetic sheet metal and said second resilient means engaging said pair of ends are legs projecting from said tray support and pressing inwardly against said pair of ends.

23. A controllable inductor as claimed in claim 26 and wherein each of said tray supports is formed of resilient non-magnetic sheet metal having a pair of coplanar supporting areas near opposite ends, the ends of said rods resting on said coplanar areas, said rods having notches in their adjacent sides near their medial parts, said signal winding portions passing through said notches and providing a space between said windings, a web extending up from said tray between said coplanar areas and passing between said signal winding portions, and retaining means on said web urging the ends of said rods down against said coplanar areas.

24. An adjustable controllable inductor including electromagnetic control means, a plurality of signal core and winding assemblies associated therewith, each assembly including an elongated tray support of resilient non-magnetic sheet metal having side portions bent up and increasing the longitudinal stiffness of the tray support, a pair of elongated magnetically saturable core elements resting on said tray support in side-by-side relationship, said core elements having a signal winding associated therewith, wedge means inserted between said core elements at one end, and an adjusting screw mounted on said tray support near one end and urging said wedge means between said core elements, the other end of said tray support being curled back over itself in a loop and engaging said core elements at their other ends.

25. An adjustable controllable inductor as claimed in claim 24 and wherein said curled end of said tray support includes two spaced ears having converging inner surfaces urging the other ends of said core elements together.

26. A controllable inductor including electromagnetic control means, a plurality of signal core and winding assemblies associated therewith, each assembly including an elongated tray support, a pair of rods of magnetically saturable material carried by said support in side-by-side relationship, signal winding portions around said rods near their medial parts, fixed means near one end of said support engaging first adjacent ends of said rods for resisting movement of said rods longitudinally of said support, first resilient means near the other end of said support acting upon the other adjacent ends of said rods and urging them toward said fixed means, second resilient means acting upon a pair of ends of said rods and urging them toward one another, a wedge inserted between said pair of adjacent ends of said rods, and an adjusting screw carried by said tray support urging said wedge therebetween, and said controllable inductor including retaining means securing each tray support in position with respect to said electromagnetic control means.

27. Mechanically adjustable electrically controllable inductance apparatus including electromagnetic control means, and a plurality of signal winding units removably supported thereon in operative relationship therewith, each of said units including a support removably secured to said control means, a signal winding and a plurality of pieces of magnetically saturable material carried by the support and defining a magnetic flux path for the signal winding thereof, first mechanically operable adjustment means carried by the support for mechanically operably adjusting the spacing between said pieces and second mechanically operable adjustment means carried by the support for adjusting the spacing between the unit and said electromagnetic control means, whereby any of said signal winding units can be removed from the control means while retaining the adjustments of both said first and second adjustment means.

28. Mechanically adjustable electrically controllable inductance apparatus including electromagnetic control means and a plurality of signal windings whose effective inductances are controlled by the electromagnetic control means and wherein mechanically operable adjustment means are provided for enabling the individual adjustment of the effective inductance characteristics of the various signal windings and wherein the adjustment can be made independently of one another, said apparatus including a plurality of removable supports, each of said supports carrying one of said signal windings and a plurality of parts of magnetically saturable material operatively associated with the signal winding and providing a path for magnetic flux, a plurality of mechanically operable adjustment means, each of said adjustment means being carried by a respective one of said supports for adjusting the spacing of the parts of magnetically saturable material for varying the reluctance of the magnetic path provided thereby so as to vary the effective inductance characteristic of the associated signal winding thereon independently of the other signal windings, and disengageable fastening means for removably securing the supports in position near said electromagnetic control means, whereby the supports can be removed from position with changing their adjustments.

References Cited in the file of this patent

UNITED STATES PATENTS

| | | |
|---|---|---|
| 1,319,181 | Sethman | Oct. 21, 1919 |
| 2,241,912 | Kersten et al. | May 13, 1941 |